(12) United States Patent
Hansen et al.

(10) Patent No.: US 8,588,283 B2
(45) Date of Patent: Nov. 19, 2013

(54) METHOD AND SYSTEM FOR FRAME FORMATS FOR MIMO CHANNEL MEASUREMENT EXCHANGE

(71) Applicant: Broadcom Corporation, Irvine, CA (US)

(72) Inventors: Christopher J. Hansen, Los Altos, CA (US); Carlos H. Aldana, Sunnyvale, CA (US); Joonsuk Kim, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/856,708

(22) Filed: Apr. 4, 2013

(65) Prior Publication Data

US 2013/0215938 A1   Aug. 22, 2013

Related U.S. Application Data

(63) Continuation of application No. 13/100,014, filed on May 3, 2011, now Pat. No. 8,437,419, which is a continuation of application No. 12/506,053, filed on Jul. 20, 2009, now Pat. No. 7,957,450, which is a continuation of application No. 11/052,353, filed on Feb. 7, 2005, now Pat. No. 7,564,914.

(60) Provisional application No. 60/636,255, filed on Dec. 14, 2004.

(51) Int. Cl.
*H04L 5/16* (2006.01)

(52) U.S. Cl.
USPC .......................................................... 375/219

(58) Field of Classification Search
USPC .......... 375/219, 299, 316, 340, 349; 370/338, 370/342, 352, 401; 455/69, 101, 132, 277
See application file for complete search history.

(56) References Cited

U.S. PATENT DOCUMENTS

| 2005/0048933 | A1* | 3/2005 | Wu et al. ................ 455/101 |
| 2006/0056532 | A1* | 3/2006 | Li et al. ................. 375/267 |
| 2006/0068738 | A1* | 3/2006 | Li et al. ................ 455/277.1 |

* cited by examiner

*Primary Examiner* — Khai Tran
(74) *Attorney, Agent, or Firm* — Garlick & Markison; Jessica W. Smith

(57) ABSTRACT

A method and system for frame formats for MIMO channel measurement exchange is provided. Aspects of a method for communicating information in a communication system may comprise transmitting data via a plurality of radio frequency (RF) channels utilizing a plurality of transmitting antenna, receiving feedback information via at least one of a plurality of RF channels, and modifying a transmission mode based on the feedback information. Aspects of a method for communicating information in a communication system may also comprise receiving data via a plurality of receiving antenna, transmitting feedback information via at least one of the plurality of RF channels, and requesting modification of a transmission mode for the received data in transmitted response messages comprising the feedback information.

20 Claims, 9 Drawing Sheets

| 612 | 614 | 616 | 618 | 620 |
|---|---|---|---|---|
| Length | Type = "Complete Channel" | # Rows | # Columns | Complete Channel Estimate Matrix |

FIG. 6b

| 632 | 634 | 636 | 638 | 640 | 642 |
|---|---|---|---|---|---|
| Length | Type = "SVD Reduced Channel" | # Rows | # Columns | Right Singular Vector Matrix | Matrix of Singular Values |

FIG. 6c

| 652 | 654 |
|---|---|
| Length | Type = "Null" |

FIG. 6d

METHOD AND SYSTEM FOR FRAME FORMATS FOR MIMO CHANNEL MEASUREMENT EXCHANGE

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility patent application Ser. No. 13/100,014, entitled "METHOD AND SYSTEM FOR FRAME FORMATS FOR MIMO CHANNEL MEASUREMENT EXCHANGE,", filed May 3, 2011, pending, which claims priority pursuant to 35 U.S.C. §120, as a continuation, to the following U.S. Utility patent application which is hereby incorporated herein by reference in its entirety and made part of the present U.S. Utility patent application for all purposes:
2. U.S. Utility patent application Ser. No. 12/506,053, entitled "METHOD AND SYSTEM FOR FRAME FORMATS FOR MIMO CHANNEL MEASUREMENT EXCHANGE,", filed Jul. 20, 2009, now U.S. Pat. No. 7,957,450, issued on Jun. 7, 2011, which claims priority pursuant to 35 U.S.C. §120, as a continuation, to the following U.S. Utility patent application which is hereby incorporated herein by reference in its entirety and made part of the present U.S. Utility patent application for all purposes:
3. U.S. Utility patent application Ser. No. 11/052,353, entitled "METHOD AND SYSTEM FOR FRAME FORMATS FOR MIMO CHANNEL MEASUREMENT EXCHANGE," filed Feb. 7, 2005, now U.S. Pat. No. 7,564,914, issued on Jul. 21, 2009, which claims priority pursuant to 35 U.S.C. §119(e) to the following U.S. Provisional patent application which is hereby incorporated herein by reference in its entirety and made part of the present U.S. Utility patent application for all purposes:
  a. U.S. Provisional Patent Application Ser. No. 60/636,255, entitled "METHOD AND SYSTEM FOR FRAME FORMATS FOR MIMO CHANNEL MEASUREMENT EXCHANGE," filed Dec. 14, 2004, now expired.

INCORPORATION BY REFERENCE

The following U.S. Utility patent application is hereby incorporated herein by reference in its entirety and made part of the present U.S. Utility patent application for all purposes:
1. U.S. Utility patent application Ser. No. 11/052,389, entitled "METHOD AND SYSTEM FOR BITS AND CODING ASSIGNMENT UTILIZING EIGEN BEAMFORMING WITH FIXED RATES FOR CLOSED LOOP WLAN,", filed Feb. 7, 2005, now U.S. Pat. No. 7,616,955, issued on Nov. 10, 2009.

BACKGROUND OF THE INVENTION

1. Technical Field of the Invention

Certain embodiments of the invention relate to wireless networking. More specifically, certain embodiments of the invention relate to a method and system for frame formats for MIMO channel measurement exchange.

2. Description of Related Art

The Institute for Electrical and Electronics Engineers (IEEE), in resolution IEEE 802.11, also referred as "802.11", has defined a plurality of specifications which are related to wireless networking. Among them are specifications for "closed loop" feedback mechanisms by which a receiving mobile terminal may feed back information to a transmitting mobile terminal to assist the transmitting mobile terminal in adapting signals which are sent to the receiving mobile terminal.

Smart antenna systems combine multiple antenna elements with a signal processing capability to optimize the pattern of transmitted signal radiation and/or reception in response to the communications medium environment. The process of optimizing the pattern of radiation is sometimes referred to as "beamforming," which may utilize linear array mathematical operations to increase the average signal to noise ratio (SNR) by focusing energy in desired directions. In conventional smart antenna systems, only the transmitter or the receiver may be equipped with more than one antenna, and may typically be located in the base transceiver station (BTS) where the cost and space associated with smart antenna systems have been perceived as more easily affordable than on mobile terminals such as cellular telephones. Such systems are also known as multiple input single output (MISO) when a multiple antenna transmitter is transmitting signals to a single antenna receiver, or single input multiple output (SIMO) when a multiple antenna receiver is receiving signals that have been transmitted from a single antenna transmitter. With advances in digital signal processing (DSP) integrated circuits (ICs) in recent years, multiple antenna multiple output (MIMO) systems have emerged in which mobile terminals incorporate smart antenna systems comprising multiple transmit antenna and multiple receive antenna. One area of early adoption of MIMO systems has been in the field of wireless networking, particularly as applied to wireless local area networks (WLANs) where transmitting mobile terminals communicate with receiving mobile terminals. IEEE resolution 802.11 comprises specifications for communications between mobile terminals in WLAN systems.

Signal fading is a significant problem in wireless communications systems, often leading to temporary loss of communications at mobile terminals. One of the most pervasive forms of fading is known as multipath fading, in which dispersion of transmitted signals due to incident reflections from buildings and other obstacles, results in multiple versions of the transmitted signals arriving at a receiving mobile terminal. The multiple versions of the transmitted signal may interfere with each other and may result in a reduced signal level detected at the receiving mobile terminal. When versions of the transmitted signal are 180° out of phase they may cancel each other such that a signal level of 0 is detected. Locations where this occurs may correspond to "dead zones" in which communication to the wireless terminal is temporarily lost. This type of fading is also known as "Rayleigh" or "flat" fading.

A transmitting mobile terminal may transmit data signals in which data is arranged as "symbols". The transmission of symbols may be constrained such that after a symbol is transmitted, a minimum period of time, $T_s$, must transpire before another symbol may be transmitted. After transmission of a symbol from a transmitting mobile terminal, some period of dispersion time, $T_d$, may transpire which may be the time over which the receiving mobile terminal is able to receive the symbol, including multipath reflections. The time $T_d$ may not need to account for the arrival of all multipath reflections because interference from later arriving reflected signals may be negligible. If the period $T_s$ is less than $T_d$ there is a possibility that the receiving mobile terminal will start receiving a second symbol from the transmitting mobile terminal while it is still receiving the first symbol. This may result in intersymbol interference (ISI), producing distortion in received signals, and possibility resulting in a loss of information. The quantity $1/T_d$ is also referred to as the "coherence bandwidth" which may indicate the maximum rate at which symbols, and correspondingly information, may be transmitted via a given communications medium. One method to compensate for ISI in signals may entail utilizing DSP algorithms which perform adaptive equalization.

Another important type of fading is related to motion. When a transmitting mobile terminal, or a receiving mobile terminal is in motion, the Doppler phenomenon may affect the frequency of the received signal. The frequency of the received signal may be changed by an amount which is a function of the velocity at which a mobile terminal is moving. Because of the Doppler effect, ISI may result when a mobile terminal is in motion, particularly when the mobile terminal is moving at a high velocity. Intuitively, if a receiving mobile terminal is in motion and nearing a transmitting mobile terminal, the distance between the two mobile terminals will change as a function of time. As the distance is reduced, the propagation delay time, $T_p$, which is the time between when a transmitter first transmits a signal and when it first arrives at a receiver, is also reduced. As the mobile terminals become closer it is also possible that $T_d$ may be increased if, for example, the transmitting mobile terminal does not reduce the radiated power of transmitted signals. If $T_p$ becomes less than $T_d$, there may be ISI due to the Doppler effect. This case, which illustrates why data rates may be reduced for mobile terminals that are in motion, is referred to as "fast fading". Because fast fading may distort signals at some frequencies while not distorting signals at other frequencies, fast fading may also be referred to as "frequency selective" fading.

Smart antenna systems may transmit multiple versions of a signal in what is known as "spatial diversity". A key concept in spatial diversity is that the propagation of multiple versions of a signal, or "spatial stream", from different antenna may significantly reduce the probability of flat fading at the receiving mobile terminal since not all of the transmitted signals would have the same dead zone.

Current transmission schemes in MIMO systems typically fall into two categories: data rate maximization, and diversity maximization. Data rate maximization focuses on increasing the aggregate data transfer rate between a transmitting mobile terminal and a receiving mobile terminal by transmitting different spatial streams from different antenna. One method for increasing the data rate from a transmitting mobile terminal would be to decompose a high bit rate data stream into a plurality of lower bit rate data streams such that the aggregate bit rates among the plurality of lower bit rate data streams is equal to that of the high bit rate data stream. Next, each of the lower bit rate data streams may be mapped to at least one of the transmitting antenna for transmission. In addition, each signal comprising one of the lower bit rate data streams is multiplicatively scaled by a weighting factor prior to transmission. The plurality of multiplicative scale factors applied to the plurality of signals comprising the lower bit rate data streams may be utilized to form the transmitted "beam" in the beamforming technique. An example of a data rate maximization scheme is orthogonal frequency division multiplexing (OFDM), in which each of the plurality of signals is modulated by a different frequency carrier signal prior to mapping and multiplicative scaling. OFDM transmission may be resistant to multipath fading in that a portion, but most likely not all, of the data transmitted may be lost at any instant in time due to multipath fading.

Diversity maximization focuses on increasing the probability that a signal transmitted by a transmitting mobile terminal will be received at a receiving mobile terminal, and on increasing the SNR of received signals. In diversity maximization, multiple versions of the same signal may be transmitted by a plurality of antenna. The case in which a transmitting mobile terminal is transmitting the same signal via all of its transmitting antenna may be the pure spatial diversity case in which the aggregate data transfer rate may be equal to that of a single antenna mobile terminal. There is a plurality of hybrid adaptations of the data rate and spatial diversity maximization schemes which achieve varying data rates and spatial diversities.

MIMO systems employing beamforming may enable the simultaneous transmission of multiple signals occupying a shared frequency band, similar to what may be achieved in code division multiple access (CDMA) systems. For example, the multiplicative scaling of signals prior to transmission, and a similar multiplicative scaling of signals after reception, may enable a specific antenna at a receiving mobile terminal to receive a signal which had been transmitted by a specific antenna at the transmitting mobile terminal to the exclusion of signals which had been transmitted from other antenna. However, MIMO systems may not require the frequency spreading techniques used in CDMA transmission systems. Thus, MIMO systems may make more efficient utilization of frequency spectrum.

One of the challenges in beamforming is that the multiplicative scale factors which are applied to transmitted and received signals may be dependent upon the characteristics of the communications medium between the transmitting mobile terminal and the receiving mobile terminal. A communications medium, such as a radio frequency (RF) channel between a transmitting mobile terminal and a receiving mobile terminal, may be represented by a transfer system function, H. The relationship between a time varying transmitted signal, x(t), a time varying received signal, y(t), and the systems function may be represented as shown in equation [1]:

$$y(t)=H \times x(t)+n(t), \text{ where} \qquad \text{equation}[1]$$

n(t) represents noise which may be introduced as the signal travels through the communications medium and the receiver itself. In MIMO systems, the elements in equation[1] may be represented as vectors and matrices. If a transmitting mobile terminal comprises M transmitting antenna, and a receiving mobile terminal comprises N receiving antenna, then y(t) may be represented by a vector of dimensions N×1, x(t) may be represented by a vector of dimensions M×1, n(t) by a vector of dimensions N×1, and H may be represented by a matrix of dimensions N×M. In the case of fast fading, the transfer function, H, may itself become time varying and may thus also become a function of time, H(t). Therefore, individual coefficients, $h_{ij}(t)$, in the transfer function H(t) may become time varying in nature.

In MIMO systems which communicate according to specifications in IEEE resolution 802.11, the receiving mobile terminal may compute H(t) each time a frame of information is received from a transmitting mobile terminal based upon the contents of a preamble field in each frame. The computations which are performed at the receiving mobile terminal may constitute an estimate of the "true" values of H(t) and may be known as "channel estimates". For a frequency selective channel there may be a set of H(t) coefficients for each tone that is transmitted via the RF channel. To the extent that H(t), which may be referred to as the "channel estimate matrix", changes with time and to the extent that the transmitting mobile terminal fails to adapt to those changes, information loss between the transmitting mobile terminal and the receiving mobile terminal may result.

Higher layer communications protocols, such as the transmission control protocol (TCP) may attempt to adapt to detected information losses, but such adaptations may be less than optimal and may result in slower information transfer rates. In the case of fast fading, the problem may actually reside at lower protocol layers, such as the physical (PHY) layer, and the media access control (MAC) layer. These protocol layers may be specified under IEEE 802.11 for WLAN systems. The method by which adaptations may be made at the PHY and MAC layers, however, may comprise a mechanism by which a receiving mobile terminal may provide feedback information to a transmitting mobile terminal based upon channel estimates which are computed at the receiving mobile terminal.

Existing closed loop receiver to transmitter mechanisms, also referred as "RX to TX feedback mechanisms", that exist under IEEE 802.11 include acknowledgement (ACK) frames, and transmit power control (TPC) requests and reports. The TPC mechanisms may allow a receiving mobile terminal to communicate information to a transmitting mobile terminal about the transmit power level that should be used, and the link margin at the receiving mobile terminal. The link margin may represent the amount of signal power that is being received, which is in excess of a minimum power required by the receiving mobile terminal to decode message information, or frames, that it receives.

A plurality of proposals is emerging for new feedback mechanisms as candidates for incorporation in IEEE resolution 802.11. Among the proposals for new feedback mechanisms are proposals from TGn (task group N) sync, which is a multi-industry group that is working to define proposals for next generation wireless networks which are to be submitted for inclusion in IEEE 802.11, and Qualcomm. The proposals may be based upon what may be referred as a "sounding frame". The sounding frame method may comprise the transmitting of a plurality of long training sequences (LTSs) that match the number of transmitting antenna at the receiving mobile terminal. The sounding frame method may not utilize beamforming or cyclic delay diversity (CDD). In the sounding frame method, each antenna may transmit independent information.

The receiving mobile terminal may estimate a complete reverse channel estimate matrix, $H_{up}$, for the channel defined in an uplink direction from the receiving mobile terminal to the transmitting mobile terminal. This may require calibration with the transmitting mobile terminal where the transmitting mobile terminal determines the forward channel estimate matrix, $H_{down}$, for the channel defined in a downlink direction from the transmitting mobile terminal to the receiving mobile terminal. To compensate for possible differences between $H_{up}$ and $H_{down}$ the receiving mobile terminal may be required to receive $H_{down}$ from the transmitting mobile terminal, and to report $H_{up}-H_{down}$ as feedback information. The TGn sync proposal may not currently define a calibration response. A channel estimate matrix may utilize 24 or more bits for each channel and for each tone, comprising 12 or more bits in an in-phase (I) component and 12 or more bits in a quadrature (Q) component.

According to the principle of channel reciprocity, the characteristics of the RF channel in the direction from the transmitting mobile terminal to the receiving mobile terminal may be the same as the characteristics of the RF channel in the direction from the receiving mobile terminal to the transmitting mobile terminal $H_{up}=H_{down}$. In actual practice, however, there may be differences in the electronic circuitry between the respective transmitting mobile terminal and receiving mobile terminal such that, in some cases, there may not be channel reciprocity. This may require that a calibration process be performed in which $H_{up}$ and $H_{down}$ are compared to reconcile differences between the channel estimate matrices. However, there may be limitations inherent in some calibration processes. For example, some proposals for new IEEE 802.11 feedback mechanisms may be limited to performing "diagonal calibrations". These methods may not be able to account for conditions in which there are differences in non-diagonal coefficients between $H_{up}$ and $H_{down}$. These non-diagonal coefficient differences may be the result of complicated antenna couplings at the respective transmitting mobile terminal and/or receiving mobile terminal. Accordingly, it may be very difficult for a calibration process to correct for these couplings. The ability of a calibration technique to accurately characterize the RF channel at any instant in time may be dependent upon a plurality of dynamic factors such as, for example, temperature variations. Another limitation of calibration procedures is that it is not known for how long a calibration renders an accurate characterization of the RF channel. Thus, the required frequency at which the calibration technique must be performed may not be known.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for MIMO channel measurement exchange. Aspects of a method for communicating information in a communication system may comprise transmitting data via a plurality of radio frequency (RF) channels utilizing a plurality of transmitting antenna, receiving feedback information via at least one of the plurality of RF channels, and modifying a transmission mode based on the feedback information. Feedback information may be requested utilizing at least one of the plurality of transmitting antenna via at least one of the plurality of RF channels. The number of transmitting antenna utilized during the transmitting of data may be modified based on the feedback information. The transmission characteristics of data transmitted via at least one of the plurality of transmitting antenna may be modified based on the feedback information. Specific feedback information may be requested in request messages.

The method may further comprise negotiating a transmission mode for the transmitting of data via at least one of the plurality of RF channels. Aspects of the method may further comprise receiving feedback information comprising channel estimates based on the transmission characteristics of the data transmitted by at least one of the plurality of transmitting antenna. Feedback information may be derived from mathematical matrix decomposition of the channel estimates. Furthermore, feedback information may be derived from mathematical averaging of the result of mathematical matrix decomposition of the channel estimates. Feedback information may also be derived from a calibration of the channel estimates for communication in at least one direction via at least one of the plurality of RF channels.

In another embodiment of the invention a method for communicating information in a communication system may comprise receiving data via a plurality of RF channels utilizing a plurality of receiving antenna, transmitting feedback information via at least one of the plurality of RF channels, and requesting modification of the transmission mode for received data in transmitted response messages comprising the feedback information. Requests for feedback information may be received utilizing at least one of the plurality of receiving antenna via at least one of the plurality of RF channels. There may be requests for modification in the number of transmitting antenna utilized during transmission of received data in the transmitted response messages comprising the feedback information. There may be requests for modification in the transmission characteristics of data received via at least one of the plurality of receiving antenna in the transmitted response messages comprising the feedback information. The response messages may comprise the feedback information requested in the request messages.

The method may further comprise negotiating the transmission mode for the data received via at least one of the plurality of RF channels. Aspects of the method may further comprise transmitting feedback information comprising channel estimates based on the transmission characteristics of the data received via at least one of the plurality of receiving antenna. Feedback information may be derived from mathematical matrix decomposition of the channel estimates. Furthermore, feedback information may be derived from mathematical averaging of the result of mathematical matrix decomposition of the channel estimates. Feedback information may also be derived from a calibration of the channel estimates for communication in at least one direction via at least one of the plurality of RF channels.

Certain aspects of a system for communicating information in a communication system may comprise a transmitter that transmits data via a plurality of RF channels utilizing a plurality of transmitting antenna, with the transmitter receiving feedback information via at least one of the plurality of RF channels, and with the transmitter modifying a transmission mode based on the feedback information. The transmitter may request feedback information utilizing at least one of the plurality of transmitting antenna via at least one of the plurality of RF channels. The number of transmitting antenna utilized during the transmitting of data may be modified based on the feedback information. The transmission characteristics of data transmitted via at least one of the plurality of transmitting antenna may be modified based on the feedback information. The transmitter may request specific feedback information in request messages.

The system may further comprise the transmitter negotiating a transmission mode for the transmitting of data via at least one of the plurality of RF channels. Aspects of the system may further comprise receiving feedback information comprising channel estimates based on the transmission characteristics of the data transmitted by at least one of the plurality of transmitting antenna. Feedback information may be derived from mathematical matrix decomposition of the channel estimates. Furthermore, feedback information may be derived from mathematical averaging of the result of mathematical matrix decomposition of the channel estimates. Feedback information may also be derived from a calibration of the channel estimates for communication in at least one direction via at least one of the plurality of RF channels.

These and other advantages, aspects and novel features of the present invention, as well as details of an illustrated embodiment thereof, will be more fully understood from the following description and drawings.

BRIEF DESCRIPTION OF THE SEVERAL VIEWS OF THE DRAWINGS

FIG. 6b is an exemplary diagram illustrating the MIMO channel response field for type="Complete Channel" in accordance with an embodiment of the invention.

FIG. 6c is an exemplary diagram illustrating the MIMO channel response field for type="SVD Reduced Channel" in accordance with an embodiment of the invention.

FIG. 6d is an exemplary diagram illustrating the MIMO channel response field for type="Null" in accordance with an embodiment of the invention.

DETAILED DESCRIPTION OF THE INVENTION

Figure 1:
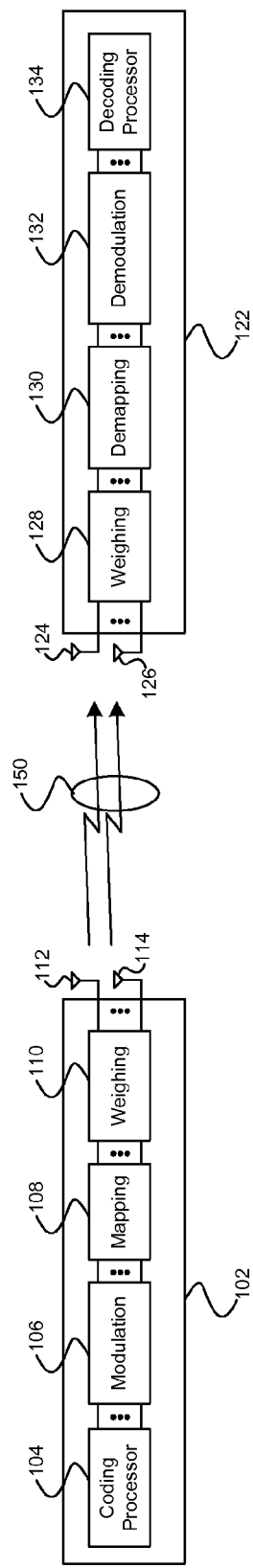
FIG. 1 is an exemplary diagram illustrating wireless communication between two mobile terminals in accordance with an embodiment of the invention.

Certain embodiments of the invention may be found in a method and system for MIMO channel measurement exchange. There are options to conventional methods of RX/TX feedback mechanisms and to other proposals for new RX/TX feedback mechanisms. In one embodiment of the invention, a receiving mobile terminal may periodically transmit feedback information, comprising a channel estimate matrix, $H_{up}$, to a transmitting mobile terminal. In another embodiment of the invention, a receiving mobile terminal may perform a singular value decomposition (SVD) on the channel estimate matrix, and subsequently transmit SVD-derived feedback information to the transmitting mobile terminal. Utilizing SVD may increase the amount of computation required at the receiving mobile terminal but may reduce the quantity of information which is transmitted to the transmitting mobile terminal via the RF channel in comparison to transmitting the entire channel estimate matrix. Yet another embodiment of the invention may expand upon the method utilizing sounding frames to incorporate calibration. In this aspect of the invention, a receiving mobile terminal, after transmitting a sounding frame, may subsequently receive a channel estimate matrix, $H_{down}$, from the transmitting mobile terminal. The receiving mobile terminal may then transmit feedback information which is based upon the difference $H_{up}-H_{down}$, to the transmitting mobile terminal.

One embodiment of the invention may comprise a MIMO channel probe and response method, which may provide a flexible solution for RX/TX feedback because it may support a plurality of feedback mechanisms. In this regard, a transmitting mobile terminal may query a receiving mobile terminal to provide feedback information about the transmit mode configuration to use. The transmitting mobile terminal may receive feedback information comprising a full channel estimate matrix as computed by a receiving mobile terminal. Alternatively, the transmitting mobile terminal may receive feedback information comprising decomposition matrices that were derived from a full channel estimate matrix, or the transmitting mobile terminal may receive feedback information comprising matrices which contain averaged values derived from the decomposition matrices. Furthermore, the transmitting mobile terminal may receive feedback information which may be utilized in a calibration procedure.

RX/TX feedback mechanisms may be required to achieve high information transfer rates even in fast fading RF channels. In fast fading RF channels, however, the channel estimate matrix H(t) may change rapidly. Thus, the amount of feedback information that is required may also increase. Transmission of a large quantity of RT/TX feedback information may create excessive overhead on the RF channel and may reduce the available rate at which other information transfer may occur via the RF channel.

SVD is a method which may reduce the quantity of channel feedback information which is transmitted between a receiving mobile terminal and a transmitting mobile terminal. U.S. application Ser. No. 11/052,389 describes SVD and is hereby incorporated by reference herein in its entirety. When computing the SVD a plurality of techniques may be utilized in performing SVD reduction on the full channel estimate matrix. In one embodiment of the invention, a full channel estimate matrix which is computed by a receiving mobile terminal, $H_{est}$, may be represented by its SVD:

$$H_{est}=USV^H, \text{ where} \qquad \text{equation[2]}$$

$H_{est}$ may be a complex matrix of dimensions $N_{rx} \times N_{tx}$, where $N_{rx}$ may be equal to the number of receive antenna at the receiving mobile terminal, and $N_{tx}$ may be equal to the number of transmit antenna at the transmitting mobile terminal, U may be an orthonormal complex matrix of dimensions $N_{rx} \times N_{rx}$, S may be a diagonal real matrix of dimensions $N_{rx} \times N_{tx}$, and V may be an orthonormal complex matrix of dimensions $N_{tx} \times N_{tx}$ with $V^H$ being the Hermitian transform of the matrix V. The singular values in the matrix S may represent the square roots of the Eigenvalues for the matrix $H_{est}$, U may represent the left singular vectors for the matrix $H_{est}$ where the columns of U may be the Eigenvectors of the matrix product $H_{est}H_{est}^H$, and $V^H$ may represent the right singular vectors for the matrix $H_{est}$ where the columns of V may be the Eigenvectors of the matrix product $H_{est}^H H_{est}$.

If we define a square $N_{tx} \times N_{tx}$ matrix, $W=H_{est}^H H_{est}$, then for any given Eigenvalue of $H_{est}$, $\lambda$, the following relationship may exist for a nonzero vector, R:

$$WR=\lambda R \qquad \text{equation[3]}$$

From which it follows:

$$(H_{est}^H H_{est}-\lambda I)R=0, \text{ where} \qquad \text{equation[4]}$$

I may be the identity matrix.

Solving equation[4], which may also be known as a "characteristic equation", may produce a set of Eigenvalues. By using each of these Eigenvalues iteratively in equation[4], a series of Eigenvectors, R, may be derived. The series of Eigenvectors, R, may form the columns of the matrix V.

Since $H_{est}^H H_{est}=VS^2V^H$, given a matrix of Eigenvectors, V, and a diagonal matrix of Eigenvalues, S, a matrix $H_{est}$ may be derived. Therefore, the channel estimate matrix $H_{est}$ from the SVD in equation[2] may be reconstructed by a transmitting mobile terminal from feedback information which contains $V^H$ and S only. Since $N_{rx}$ may be greater than $N_{tx}$, the quantity of information contained in matrices $V^H$ and S may be less than that contained in the matrix $H_{est}$. In an embodiment of the invention, each of the complex coefficients of the $V^H$ matrix may be encoded utilizing, for example, a signed 12-bit integer for an I component, and a signed 12-bit integer for a Q component. Each of the nonzero diagonal real coefficients of the S matrix may be encoded as, for example, IEEE 32-bit floating point numbers.

For an RF channel, $H_{est}$ may be different for tones of different frequencies that are transmitted via the RF channel. Thus, a plurality of channel estimate matrices, $H_{est}$, may be computed to account for each tone which may be transmitted via the RF channel. In another embodiment of the invention, a further reduction in the quantity of information that is transmitted in feedback information may be achieved by computing a plurality of SVD on $H_{est}$ as in equation[2], and averaging the coefficient values in matrices $V^H$ and S over a plurality of tones. In one aspect of the invention, if M tones are transmitted via the RF channel, an adaptive modulation technique may be utilized, for example, and a diagonal matrix D derived based upon an average of the individual matrices $S_i$ that are derived from each of the tones:

$$D = 1/M \times \sum_{i=1}^{M} S_i \qquad \text{equation [5]}$$

Adaptive modulation may limit the representation of each nonzero coefficient in the diagonal matrix, $d_{ii}$ to 8 bits per averaged tone. Thus by replacing the plurality of matrices $S_i$ with the matrix D, the quantity of singular value matrix information which is transmitted in feedback information may be reduced by a factor of 4M.

A plurality of L matrices, $Avg_k(V^H)$, may be derived by averaging the coefficients from the matrices $V^H$ in groups of 6 tones. Furthermore, the matrix of complex coefficient average values may be represented in the form:

$$Avg_k(V(f)^H)=|Avg_k(V(f)^H)|e^{j\phi}, \text{ where} \qquad \text{equation[6]}$$

$V(f)^H$ expresses $V^H$ as a function of frequency, $|Avg_k(V(f)^H)|$ may represent the magnitude of the average of the I and Q components among the plurality of 6 $V(f)^H$ matrices whose coefficients are averaged in a group, and $\phi$ may represent the phase of the corresponding I and Q components, the index k may indicate an individual matrix of averaged values of $V^H$, and L may equal M/6. In an exemplary embodiment of the invention, the magnitude $|Avg_k(V(f)^H)|$ may be represented as a 6-bit integer, and the phase $\phi$ may be represented as a 4-bit integer. By replacing the plurality of M matrices, $V^H$, with a plurality of L matrices $Avg(V(f)^H)$, the quantity of singular vector information which is transmitted in feedback information may be reduced by a factor of 6×(24/10).

The invention is not limited to an average of singular values as expressed in equation[5] and the invention is not limited to expressing the average as an 8-bit binary data entity. Similarly, the invention as expressed in equation[6] is not limited to computing averages in groups of 6 tones, and the invention is not limited to expressing the magnitudes of the averages as 6-bit integers and the phases of the averages as 4-bit integers.

Other possibilities exist and are contemplated as falling within the scope of the present invention.

In another embodiment of the invention, a calibration procedure may be performed between the transmitting mobile terminal and the receiving mobile terminal. In this case, the transmitting mobile terminal may compute a full channel estimate matrix, $H_{down}$. The transmitting mobile terminal may transmit $H_{down}$ to the receiving mobile terminal. The receiving mobile terminal may then perform an SVD on $H_{down}$ to derive matrices, $S_{down}$, and $V_{down}^H$ based on the setting of $U_{down}$ equal to the value of U that is derived from $H_{est}$ in equation[2]. Furthermore, the receiving mobile terminal may derive $D_{down}$ and $Avg_k(V_{down}(f)^H)$. The receiving mobile terminal may perform calibration by comparing the matrix $D_{down}$ to the matrix D as derived in equation[5]:

$$D_\Delta = D_{down} - D \qquad \text{equation[7]}$$

and by comparing the plurality of matrices $Avg_k(V_{down}(f)^H)$ to the plurality of matrices $Avg_k(V(f)^H)$ as derived in equation [6]:

$$Avg_k(V_\Delta) = Avg_k(V_{down}(f)^H) - Avg_k(V(f)^H) \qquad \text{equation[8]}$$

If $Avg_k(V_\Delta)$ is equal to 0 for all values k=1, . . . L, then the SVD from equation[2] may be reconstructed at the transmitting mobile terminal by sending the matrix $D_\Delta$ only. If $Avg_k(V_\Delta)$ is not equal to 0 for all values k=1, . . . L, then the SVD from equation[2] may be reconstructed at the transmitting mobile terminal by sending the matrix $D_\Delta$ and the plurality of nonzero coefficients from the matrices $Avg_k(V_\Delta)$.

FIG. 1 is an exemplary diagram illustrating wireless communication between two mobile terminals in accordance with an embodiment of the invention. Referring to FIG. 1 there is shown a first mobile terminal 102, a second mobile terminal 122 and a radio frequency (RF) communication channel 150. An example of a standard method by which a first mobile terminal 102 and a second mobile terminal 122 may communicate via an RF channel 150 may be defined in IEEE resolution 802.11n. A plurality of different frequencies may be utilized to communicate via the RF channel 150 and one or more frequencies may be utilized to communicate information between the first mobile terminal 102 and a second mobile terminal 122.

The first mobile terminal 102 may further comprise a coding processor 104, a modulation block 106, a mapping block 108, a weighing block 110, and one or more antenna such as the plurality of antenna 112, . . . 114. The second mobile terminal 122 may further comprise one or more antenna such as the plurality of antenna 124, . . . 126, a weighing block 128, a demapping block 130, a demodulation block 132, and a decoding processor 134.

The coding processor 104 may comprise suitable logic, circuitry and/or code that may be adapted to perform coding on information which is to be transmitted by the transmitting mobile terminal such as, for example, binary convolutional coding (BCC). The modulation block 106 may comprise suitable logic, circuitry and/or code that may be adapted to modulate baseband information into one or more RF signals. The mapping block 108 may comprise suitable logic, circuitry and/or code that may be adapted to assign an RF signal for transmission via one or more antenna 112, . . . 114. The weighing block 110 may comprise suitable logic, circuitry and/or code that may be adapted to assign scale factors, or weights, to individual RF signals for transmission via one or more antenna 112, . . . 114.

In the second mobile terminal 122, one or more antenna 124, . . . 126 may receive information from the first mobile terminal 102 via one or more frequencies over the RF communication channel 150. The weighing block 128 may comprise suitable logic, circuitry and/or code that may be utilized to assign weights to individual RF signals received via one or more antenna 124, . . . 126. The demapping block 130 may comprise suitable logic, circuitry and/or code that may be utilized to reconcile a set of RF signals received from one or more antenna 124, . . . 126 into another set of one or more RF signals.

The demodulation block 132 may comprise suitable logic, circuitry and/or code that may be adapted to demodulate one or more RF signals into one or more baseband signals. The decoding processor 134 may comprise suitable logic, circuitry and/or code that may be adapted to perform decoding of information received from one or more antenna 124, . . . 126 into, for example, binary information.

Figure 2:
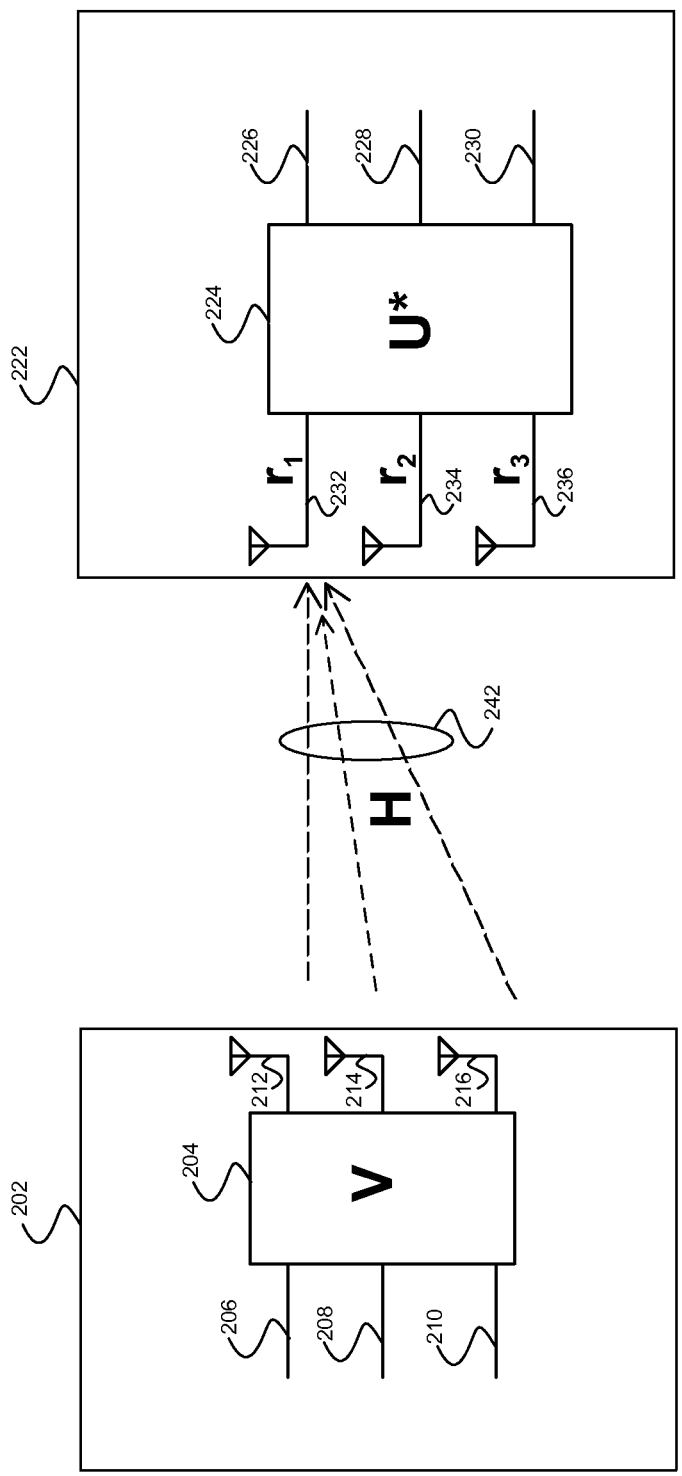
FIG. 2 is an exemplary diagram illustrating Eigen beamforming in accordance with an embodiment of the invention.

FIG. 2 is an exemplary diagram illustrating Eigen beamforming in accordance with an embodiment of the invention. Referring to FIG. 2 there is shown a transmitting mobile terminal 202, a receiving mobile terminal 222, and a plurality of RF channels 242. The transmitting mobile terminal 202 comprises a transmit filter coefficient block V 204, a first source signal $s_1$ 206, a second source signal $s_2$ 208, a third source signal $s_3$ 210, and a plurality of transmitting antenna 212, 214, and 216.

In operation, the transmitting antenna 212 may be adapted to transmit a signal $x_1$, the transmitting antenna 214 may transmit a signal $x_2$, and the transmitting antenna 216 may transmit a signal $x_3$. In beamforming each transmitted signal $x_1$, $x_2$, and $x_3$ may be a function of a weighted summation of at least one of the plurality of the source signals $s_1$, $s_2$, and $s_3$. The weights may be determined by the transmit filter coefficient block V such that:

$$X = VS, \text{ where} \qquad \text{equation[9]}$$

S may be represented by, for example, a 3×1 matrix {$s_1$, $s_2$, $s_3$}, and X may be represented by, for example, a 3×1 matrix {$x_1$, $x_2$, $x_3$}. Accordingly, V may be represented as a 3×3 matrix {{$v_{11}$, $v_{12}$, $v_{13}$} {$v_{21}$, $v_{22}$, $v_{23}$} {$v_{31}$, $v_{32}$, $v_{33}$}}.

The receiving mobile terminal 222 comprises a receive filter coefficient block U* 224, a first destination signal $\tilde{y}_1$ 226, a second destination signal $\tilde{y}_2$ 228, a third destination signal $\tilde{y}_3$ 230, and a plurality of receiving antenna 232, 234, and 236. The receiving antenna 232 may be adapted to receive a signal $y_1$, the receiving antenna 234 may receive a signal $y_2$, and the receiving antenna 236 may receive a signal $y_3$. The characteristics of the plurality of RF channels 242 utilized for communication between the transmitting mobile terminal 202, and the receiving mobile terminal 222 may be represented mathematically by a transfer coefficient matrix H.

Figure 3:
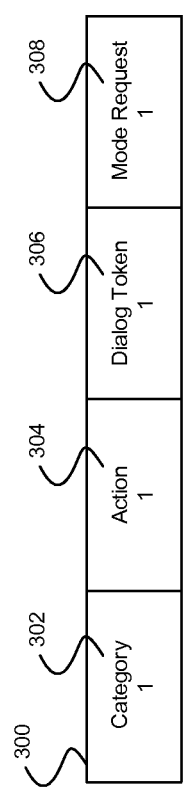
FIG. 3 is an exemplary diagram illustrating the MIMO mode request frame in accordance with an embodiment of the invention.

FIG. 3 is an exemplary diagram illustrating the MIMO mode request frame in accordance with an embodiment of the invention. Referring to FIG. 3 there is shown a MIMO mode request frame 300, which comprises a category field 302, an action field 304, a dialog token field 306, and a mode request field 308. The category field 302 may comprise 1 octet of binary data, for example, which may identify the general category of the frame within the wider context of all frames which are defined in IEEE 802.11. The category field 302 may be set to a specific value to identify the category which is defined for the MIMO mode request frame. The action field 304 may comprise 1 octet of binary data, for example, which may identify the frame type. The action field 304 may be set to a specific value to identify a MIMO mode request frame. The dialog token field 306 may comprise 1 octet of binary data, for example, which may identify a particular MIMO mode request frame. This field may be utilized to identify a specific MIMO mode request frame in the event that a transmitting mobile terminal 202 has transmitted a plurality of MIMO mode request frames, such as may be the case if a transmitting mobile terminal 202 were communicating with a plurality of receiving mobile terminals 222.

The mode request field 308 may comprise 1 octet of binary data, for example, which may identify the function which is to be performed by the mobile terminal that receives the MIMO mode request frame. The mode request field 308 may be set to a specific value to indicate that feedback information about the transmit mode to be utilized when transmitting to a receiving mobile terminal 222 is being requested by the transmitting mobile terminal 202. The mode request field 308 may also comprise information which indicates capabilities of the transmitting mobile terminal 202. A receiving mobile terminal 222 that receives the MIMO mode request frame may use information about capabilities of the transmitting mobile terminal 202 in providing feedback information to the transmitting mobile terminal 202 in response to the MIMO mode request frame.

The MIMO mode request frame 300 may be transmitted by a transmitting mobile terminal 202 to a receiving mobile terminal 222 via an RF channel 242 to request that the receiving mobile terminal 222 provide feedback information about the transmit mode that the transmitting mobile terminal 202 should use when transmitting information to the receiving mobile terminal 222 via the RF channel 242.

Figure 4:
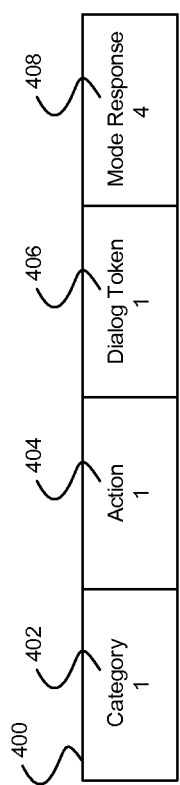
FIG. 4 is an exemplary diagram illustrating the MIMO mode response frame in accordance with an embodiment of the invention.

FIG. 4 is an exemplary diagram illustrating the MIMO mode response frame in accordance with an embodiment of the invention. Referring to FIG. 4 there is shown a MIMO mode response frame 400, which comprises a category field 402, an action field 404, a dialog token field 406, and a mode response field 408. The category field 402 may comprise 1 octet of binary data, for example, which may identify the general category of the frame within the wider context of all frames which are defined in IEEE 802.11. The category field 402 may be set to a specific value to identify the category which is defined for the MIMO mode response frame. The action field 404 may comprise 1 octet of binary data, for example, which may identify the frame type. The action field 404 may be set to a specific value to identify a MIMO mode response frame. The dialog token field 406 may comprise 1 octet of binary data, for example, which may identify a particular MIMO mode response frame. This field may be utilized to identify a specific MIMO mode response frame to a transmitting mobile terminal 202.

The mode response field 408 may comprise feedback information, which may be fed back in response to a previous MIMO mode request frame. The mode response field 408 may comprise 4 octets of binary data, for example. The mode response field 408 may comprise feedback information pertaining to a number of spatial streams that a transmitting mobile terminal 202 may utilize when transmitting to a receiving mobile terminal 222, a number of transmit antenna that a transmitting mobile terminal 202 may utilize, and bandwidth that may be utilized by a transmitting mobile terminal 202. In addition, the mode response field 408 may comprise feedback information about a code rate to use for information transmitted by a transmitting mobile terminal 202, an error correcting code type to use, and a type of modulation to use for information transmitted by a transmitting mobile terminal 202 to a receiving mobile terminal 222. A receiving mobile terminal 222 may indicate a null response in the mode request field 408 to indicate, for example, that the receiving mobile terminal 222 is unable to determine a requested transmit mode in response to a MIMO mode request frame 300.

The MIMO mode response frame 400 may be transmitted by a receiving mobile terminal 222 to a transmitting mobile terminal 202 in response to a previous MIMO mode request frame 300 to provide feedback information about the transmit mode that the transmitting mobile terminal 202 should use when transmitting information to the receiving mobile terminal 222 via the RF channel 242.

In an embodiment of the invention with reference to FIGS. 2-4, the transmitting mobile terminal 202 may transmit a MIMO mode request frame 300 to a receiving mobile terminal 222. In the MIMO mode request frame 300 an integer value, seq, may be contained in the dialog token field 306 of the MIMO mode request frame 300. If the receiving mobile terminal 222 incorporates the value, seq, in the dialog token field 406 in the MIMO mode response frame 400, the transmitting mobile terminal 202 which receives the MIMO mode response frame 400 may be able to identify the frame as being the response to the MIMO mode request frame 300 that had been sent previously by the transmitting mobile terminal 202 to the receiving mobile terminal 222.

In another embodiment of the invention, the transmitting mobile terminal 202 may transmit a first MIMO mode request frame 300 to a first receiving mobile terminal 222. The transmitting mobile terminal 202 may then transmit a second MIMO mode request frame to a second receiving mobile terminal. In the first MIMO mode request frame an integer value, seq1, may be contained in the dialog token field 306 of the MIMO mode request frame 300. In the second MIMO mode request frame an integer value, seq2, may be contained in the dialog token field 306 of the MIMO mode request frame 300. If the first receiving mobile terminal 222 incorporates the value, seq1, in the dialog token field 406 in the MIMO mode response frame 400, the transmitting mobile terminal 202 which receives the MIMO mode response frame 400 may be able to identify the frame as being the response to the first MIMO mode request frame 300 that had been sent previously by the transmitting mobile terminal 202 to the first receiving mobile terminal 222. If the second receiving mobile terminal 222 incorporates the value, seq2, in the dialog token field 406 in the MIMO mode response frame 400, the transmitting mobile terminal 202 which receives the MIMO mode response frame 400 may be able to identify the frame as being the response that corresponds to the second MIMO mode request frame 300 that had been sent previously by the transmitting mobile terminal 202 to the second receiving mobile terminal.

Any individual field in either the MIMO mode request frame 300 or the MIMO mode response frame 400 may comprise a plurality of octets of binary data. The MIMO mode request frame 300, the MIMO mode response frame 400, and any individual field in either the MIMO mode request frame 300 or the MIMO mode response frame 400 may be of variable length. The MIMO mode request frame 300 or the MIMO mode response frame 400 may comprise information which indicates the length of the respective frame. The MIMO mode request frame 300 or the MIMO mode response frame 400 may comprise information which indicates the length of any fields contained within the respective frame. The MIMO mode request frame 300 and the MIMO mode response frame 400 may comprise other information which enable a receiving mobile terminal 222 and a transmitting mobile terminal 202 to negotiate a transmission mode for a common RF channel.

Figure 5:
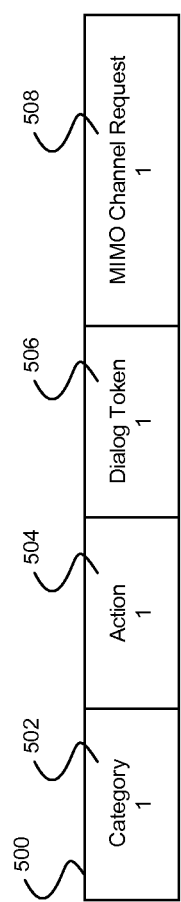
FIG. 5 is an exemplary diagram illustrating the MIMO channel request frame in accordance with an embodiment of the invention.

FIG. 5 is an exemplary diagram illustrating the MIMO channel request frame in accordance with an embodiment of the invention. Referring to FIG. 5 there is shown a MIMO channel request frame 500, which comprises a category field 502, an action field 504, a dialog token field 506, and a MIMO channel request field 508. The category field 502 may comprise 1 octet of binary data, for example, which may identify the general category of the frame within the wider context of all frames which are defined in IEEE 802.11. The category field 502 may be set to a specific value to identify the category which is defined for the MIMO channel request frame. The action field 504 may comprise 1 octet of binary data, for example, which may identify the frame type. The action field 504 may be set to a specific value to identify a MIMO channel request frame. The dialog token field 506 may comprise 1 octet of binary data, for example, which may identify a particular MIMO channel request frame. This field may be utilized to identify a specific MIMO channel request frame in the event that a transmitting mobile terminal 202 has transmitted a plurality of MIMO channel request frames, such as may be the case if a transmitting mobile terminal 202 were communicating with a plurality of receiving mobile terminals 222.

The MIMO channel request frame 500 may be transmitted by a transmitting mobile terminal 202 to a receiving mobile terminal 222 via an RF channel 242 to request that the receiving mobile terminal 222 provide feedback information about the channel estimates that the receiving mobile terminal 222 has computed for the RF channel 242.

The MIMO channel request field 508 may comprise 1 octet of binary data, for example, which may identify the function which is to be performed by the mobile terminal that receives the MIMO channel request frame. The channel request field 508 may be set to a specific value to indicate that feedback information about the channel estimates that the receiving mobile terminal 222 has computed for the RF channel 242 is being requested by the transmitting mobile terminal 202. The MIMO channel request field 508 may also comprise information from the channel estimation matrix, $H_{down}$, which is computed at the transmitting mobile terminal 202. A receiving mobile terminal 222 that receives the MIMO channel request frame may use $H_{down}$ information from the transmitting mobile terminal 202 to perform calibration.

Figure 6A:
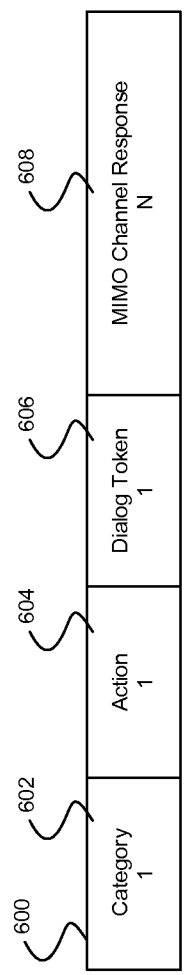
FIG. 6a is an exemplary diagram illustrating the MIMO channel response frame in accordance with an embodiment of the invention.

FIG. 6a is an exemplary diagram illustrating the MIMO channel response frame in accordance with an embodiment of the invention. Referring to FIG. 6a there is shown a MIMO channel response frame 600, which comprises a category field 602, an action field 604, a dialog token field 606, and a MIMO channel response field 608. The category field 602 may comprise 1 octet of binary data, for example, which may identify the general category of the frame within the wider context of all frames which are defined in IEEE 802.11. The category field 602 may be set to a specific value to identify the category which is defined for the MIMO channel response frame. The action field 604 may comprise 1 octet of binary data, for example, which may identify the frame type. The action field 604 may be set to a specific value to identify a MIMO channel response frame. The dialog token field 606 may comprise 1 octet of binary data, for example, which may identify a particular MIMO channel response frame. This field may be utilized to identify a specific MIMO channel response frame to a transmitting mobile terminal 202.

The MIMO channel response field 608 may comprise a variable number of octets of binary data, for example, which may comprise feedback information in response to a previous MIMO channel request frame. FIG. 6b is an exemplary diagram illustrating the MIMO channel response field for type="complete channel" in accordance with an embodiment of the invention. The length subfield 612 within the MIMO channel response field 608 may comprise 2 octets of binary data, for example, which may comprise information which indicates the length of the MIMO channel response field 608. The type subfield 614 within the MIMO channel response field may comprise 1 octet of binary data, for example, which may comprise information that indicates the feedback information which is contained the MIMO channel response field 608. In FIG. 6b the feedback information type is shown to indicate "complete channel". Subfield 616 within the MIMO channel response field 608 may comprise 1 octet of binary data, for example, which may comprise an indication of the number of rows in the matrix of feedback information which is contained in the MIMO channel response field 608. Subfield 618 within the MIMO channel response field 608 may comprise 1 octet of binary data, for example, which may comprise an indication of the number of columns in the matrix of feedback information which is contained in the MIMO channel response field 608. Subfield 620 within the MIMO channel response field 608 may comprise a variable number of octets based upon the contents of subfields 616 and 618, for example, which may comprise the complete channel estimate matrix which was computed during processing of the preceding MIMO channel request frame 500.

FIG. 6c is an exemplary diagram illustrating the MIMO channel response field for type="SVD Reduced Channel" in accordance with an embodiment of the invention. The length subfield 632 within the MIMO channel response field 608 may comprise 2 octets of binary data, for example, which may comprise information which indicates the length of the MIMO channel response field 608. The type subfield 634 within the MIMO channel response field may comprise 1 octet of binary data, for example, which may comprise information that indicates the feedback information which is contained the MIMO channel response field 608. In FIG. 6c the feedback information type is shown to indicate "SVD reduced channel". Subfield 636 within the MIMO channel response field 608 may comprise 1 octet of binary data, for example, which may comprise an indication of the number of rows in the matrix of feedback information which is contained in the MIMO channel response field 608. Subfield 638 within the MIMO channel response field 608 may comprise 1 octet of binary data, for example, which may comprise an indication of the number of columns in the matrix of feedback information which is contained in the MIMO channel response field 608. Subfield 640 within the MIMO channel response field 608 may comprise a variable number of octets based upon the contents of subfields 636 and 638, for example, which may comprise the right singular vector matrix, V. Subfield 642 within the MIMO channel response field 608 may comprise a variable number of octets based upon the contents of subfields 636 and 638, for example, which may comprise the diagonal matrix of singular values, S. The matrices V and S may be derived from the complete channel estimate matrix which was computed during the processing of the preceding MIMO channel request frame 500.

FIG. 6d is an exemplary diagram illustrating the MIMO channel response field for type="Null" in accordance with an embodiment of the invention. The length subfield 652 within the MIMO channel response field 608 may comprise 2 octets of binary data, for example, which may comprise information which indicates the length of the MIMO channel response field 608. The type subfield 654 within the MIMO channel response field may comprise 1 octet of binary data, for example, which may comprise information that indicates the feedback information which is contained the MIMO channel response field 608. In FIG. 6d the feedback information type is shown to indicate "Null". If the feedback information type is "null", the receiving mobile terminal 222 may not have been able to compute a channel estimate, in which case the MIMO channel response field 608 may not comprise feedback information.

The MIMO channel response frame 600 may be transmitted by a receiving mobile terminal 222 to a transmitting mobile terminal 202 in response to a previous MIMO channel request frame 500 to provide feedback information about the channel estimates that the receiving mobile terminal 222 has computed for the RF channel 242.

If the quantity of data from SVD derived matrices are further reduced by averaging, the MIMO channel response field 608 may comprise an indication of the number of rows in the matrices which are contained in the MIMO channel response field 608, an indication of the number of columns in the matrices which are contained in the MIMO channel response field, the matrix D as derived in equation[5], and the plurality of matrices $Avg_k(V(f)^H)$ as derived in equation[6]. If the calibration procedure is used, the MIMO channel response field 608 may comprise an indication of the number of rows in the matrices which are contained in the MIMO channel response field 608, an indication of the number of columns in the matrices which are contained in the MIMO channel response field 608, the matrix $D_A$ as derived in equation[7], and the matrix $Avg_k(V_A)$ as derived in equation[8].

The initial MIMO channel request frame 500 may be sent by the transmitting mobile terminal 202 to the receiving mobile terminal 222 without beamforming, and utilizing a number of spatial streams may equal the number of antenna. For each spatial stream, the lowest data rate may be used when transmitting the MIMO channel request frame 500 to enable the transfer of information between the transmitting mobile terminal 202 and receiving mobile terminal 222 to be as robust as possible. For example, with reference to FIG. 2, without beamforming antenna 212 may transmit a signal which is proportional to signal $s_1$ 206 only, while antenna 214 may transmit a signal which is proportional to signal $s_2$ 208 only, and antenna 216 may transmit a signal which is proportional to signal $s_3$ 210 only such that:

$$X=cS, \text{ where} \qquad \text{equation}[10]$$

S may be represented by a 3×1 matrix $\{s_1, s_2, s_3\}$, X may be represented by a 3×1 matrix $\{x_1, x_2, x_3\}$, and c may be a scalar entity.

Any individual field in either the MIMO channel request frame 500 or the MIMO channel response frame 600 may comprise a plurality of octets of binary data. The MIMO channel request frame 500, the MIMO channel response frame 600, and any individual field in either the MIMO channel request frame 500 or the MIMO channel response frame 600 may be of variable length. The MIMO channel request frame 500 or the MIMO channel response frame 600 may comprise information which indicates the length of the respective frame. The MIMO channel request frame 500 or the MIMO channel response frame 600 may comprise information which indicates the length of any fields contained within the respective frame. The MIMO channel request frame 500 and the MIMO channel response frame 600 may comprise other information which enable a receiving mobile terminal 222 to communicate feedback information about the channel estimates that the receiving mobile terminal 222 has computed for the RF channel 242 to a transmitting mobile terminal 202.

Figure 7:
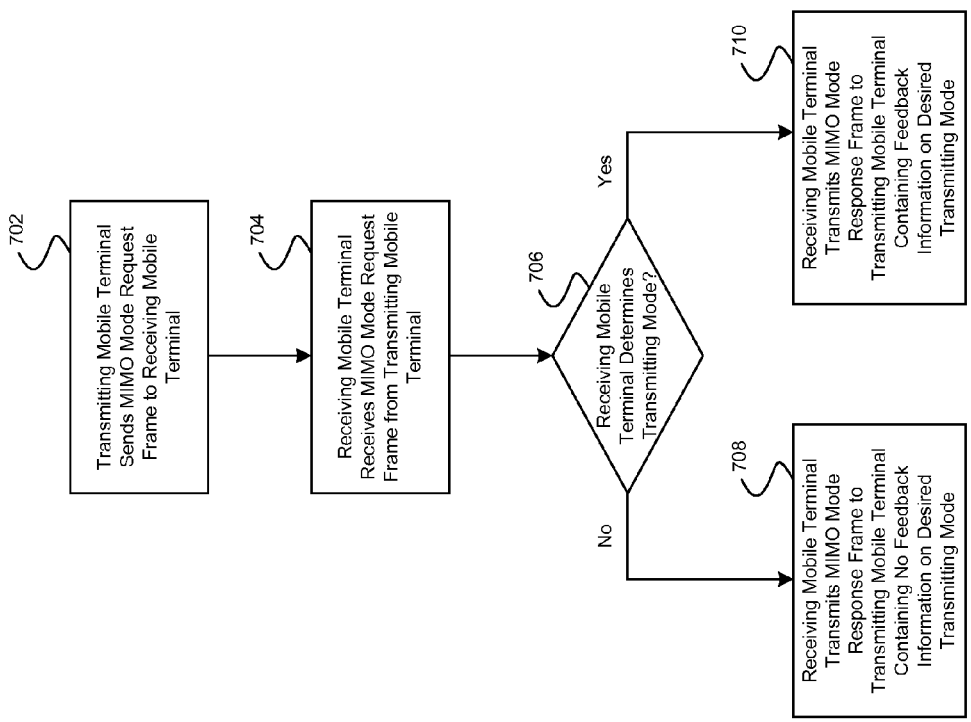
FIG. 7 is an exemplary flowchart illustrating steps in the exchange of RX/TX feedback information utilizing MIMO mode request and MIMO mode response frames in accordance with an embodiment of the invention.

FIG. 7 is an exemplary flowchart illustrating steps in the exchange of RX/TX feedback information utilizing MIMO mode request and MIMO mode response frames in accordance with an embodiment of the invention. Referring to FIG. 7, in step 702 a transmitting mobile terminal 202 may send a MIMO mode request frame to a receiving mobile terminal 222. In step 704 the receiving mobile terminal 222 may receive the MIMO mode request frame from the transmitting mobile terminal 202. In step 706 the receiving mobile terminal 222 may determine the transmitting mode. If the receiving mobile terminal 222 determines the transmitting mode, in step 710, the receiving mobile terminal 222 may transmit a MIMO mode response frame to the transmitting mobile terminal 202 containing information about the desired transmitting mode. If the receiving mobile terminal 222 does not determine the transmitting mode, in step 708, the receiving mobile terminal 222 may transmit a MIMO mode response frame to the transmitting mobile terminal 202 which contains no feedback information on the desired transmitting mode.

Figure 8:
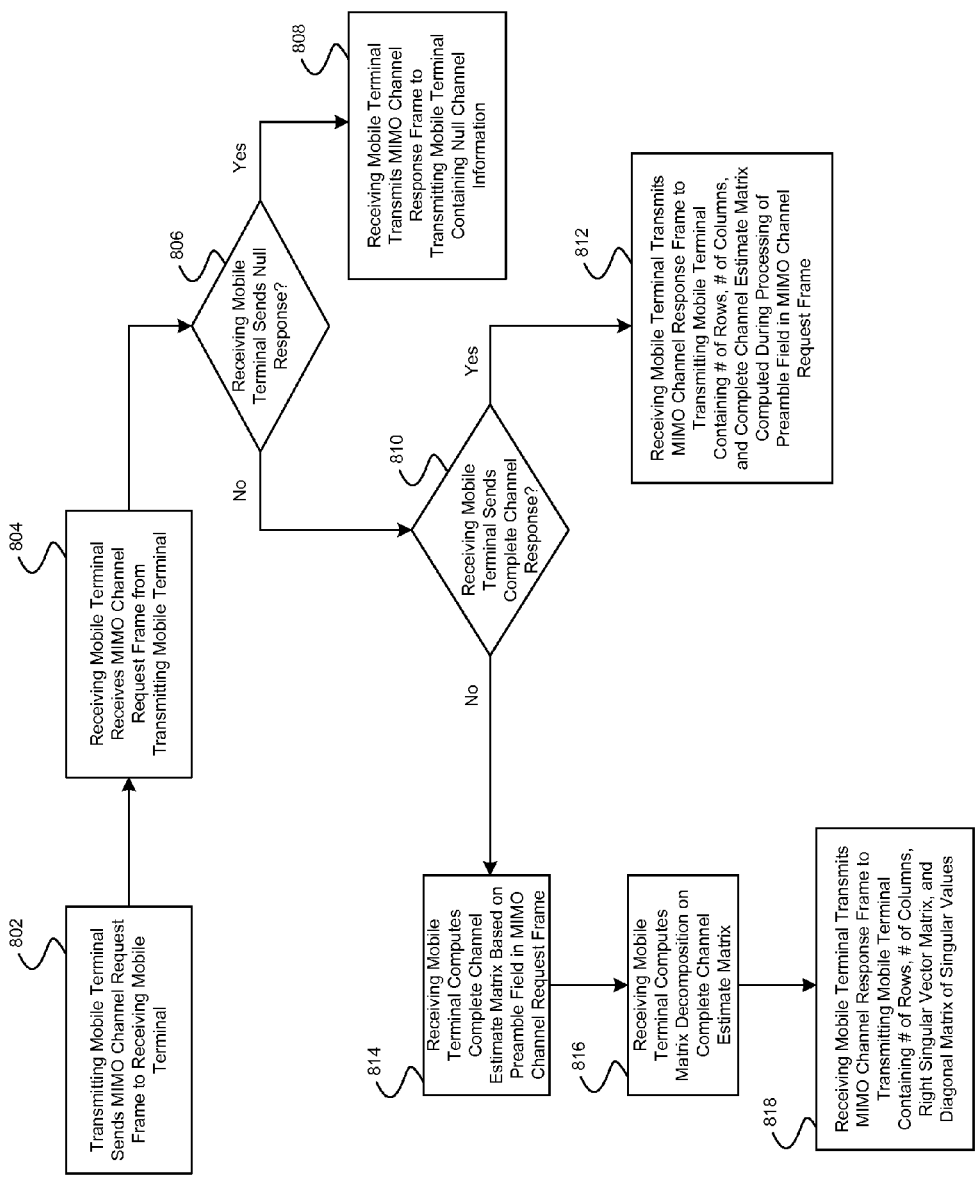
FIG. 8 is an exemplary flowchart illustrating steps in the exchange of RX/TX feedback information utilizing MIMO channel request and MIMO channel response frames in accordance with an embodiment of the invention.

FIG. 8 is an exemplary flowchart illustrating steps in the exchange of RX/TX feedback information utilizing MIMO channel request and MIMO channel response frames in accordance with an embodiment of the invention. Referring to FIG. 8, in step 802 a transmitting mobile terminal 202 may send a MIMO channel request frame to a receiving mobile terminal 222. In step 804 the receiving mobile terminal 222 may receive the MIMO channel request frame from the transmitting mobile terminal 202. In step 806 the receiving mobile terminal 222 may determine whether a null response is to be returned to the transmitting mobile terminal 202. If a null response is to be returned, in step 808, the receiving mobile terminal 222 may transmit a MIMO channel response frame to the transmitting mobile terminal 202 containing null channel information.

If a null response is not to be sent, in step 810 the receiving mobile terminal may determine whether to send a complete channel response. If a complete channel response is to be sent, in step 812 the receiving mobile terminal 222 may transmit a MIMO channel response frame to the transmitting mobile terminal 202 containing the number of transmit antenna, the number of receive antenna, and a complete channel estimate matrix computed during the processing of the preamble field in the preceding MIMO channel request frame.

If a complete channel response is not to be sent, in step 814, the receiving mobile terminal 222 may compute a complete channel estimate matrix based on the preamble field in the preceding MIMO channel request frame. In step 816, the receiving mobile terminal 222 may compute the matrix decomposition on the complete channel estimate matrix. In step 816, matrix decomposition on the complete channel estimate matrix may be performed by a plurality of methods comprising SVD, QR decomposition, lower diagonal, diagonal, upper diagonal (LDU) decomposition, and Cholesky decomposition. In step 818, the receiving mobile terminal 222 may transmit a MIMO channel response frame to the transmitting mobile terminal 202 containing the number of transmit antenna, the number of receive antenna, the right singular vector matrix, and the diagonal matrix of singular values.

The channel feedback method may enable more precise estimation of RF channel characteristics than is possible with conventional IEEE 802.11 systems, or when utilizing other proposals for new RX/TX feedback mechanisms. In conventional IEEE 802.11 specifications, there may be no feedback mechanism by which the receiving mobile terminal 222 may indicate a specific transmitting mode to be utilized by a transmitting mobile terminal 202. Consequently, in conventional systems based upon IEEE 802.11, the transmitting mobile terminal 202 may independently select a transmitting mode with no mechanism by which the transmitting mode may be adapted to the requirements of the receiving mobile terminal 222. The MIMO mode response mechanism may enable a receiving mobile terminal 222 to suggest a particular transmitting mode to the transmitting mobile terminal 202.

The channel feedback method described may enable the receiving mobile terminal 222 to efficiently communicate feedback information, to the transmitting mobile terminal 202, about the characteristics of the RF channel 242 as detected at the receiving mobile terminal 222. In response, the transmitting mobile terminal 202 may adapt the RF signals that are transmitted to the receiving mobile terminal 222 based upon the channel feedback information received from the receiving mobile terminal 222. Embodiments of the invention which have been described may minimize the quantity of feedback information and thereby reduce the amount of overhead imposed on the RF channel as a result of RX/TX feedback. This may enable the channel feedback mechanism to be utilized effectively in fast fading RF channels. As a result, the channel feedback method may enable the transmitting mobile terminal to achieve higher information transfer rates, and more effective beamforming on signals that are transmitted to the receiving mobile terminal via an RF channel.

The invention may not be limited to the SVD method to reduce the amount of feedback information which is sent via an RF channel. A plurality of methods may be utilized for reducing the quantity of feedback information when compared to the amount of information that is contained in a full channel estimate matrix. These methods may comprise, for example, SVD, LDU decomposition, Eigenvalue decomposition, QR decomposition, and Cholesky decomposition.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method operable in a wireless terminal for wireless communication, comprising:
   transmitting to another wireless terminal a channel sounding frame;
   receiving from the another wireless terminal a channel response frame including feedback information generated in response to the channel sounding frame, wherein the channel response frame includes a type field that includes an indication of one of a plurality of types of feedback information.

2. The method of claim 1, wherein the feedback information includes one or more feedback matrices and the type field includes an indication of a type of the feedback matrices.

3. The method of claim 2, wherein the type field includes an indication of at least one of the following types of feedback matrices: channel estimate matrices and beamforming matrices.

4. The method of claim 2, wherein the feedback information includes one or more channel estimate matrices and the type field includes an indication of channel estimate matrices.

5. The method of claim 2, wherein the feedback information includes one or more beamforming feedback matrices V and the type field includes an indication of beamforming feedback matrices V.

6. The method of claim 5, wherein the one or more beamforming feedback matrices V are right singular vector matrices V.

7. The method of claim 1, wherein the feedback information includes one or more beamforming feedback matrices S and the type field includes an indication of beamforming feedback matrices S.

8. The method of claim 7, wherein the one or more beamforming feedback matrices S are diagonal matrix of singular values.

9. The method of claim 1, wherein the channel response frame further includes a row field to indicate a number of rows of the one or more feedback matrices and a column field to indicate a number of columns of the one or more feedback matrices.

10. A mobile terminal, comprising:
    at least one processor operable to:
      generate a channel sounding frame for transmission to another mobile terminal;
      process from the another mobile terminal a channel response frame including feedback information generated in response to the channel sounding frame, wherein the channel response frame includes a type field that includes an indication of one of a plurality of types of feedback information.

11. The mobile terminal of claim 10, wherein the feedback information includes one or more feedback matrices and the type field includes an indication of a type of the feedback matrices.

12. The mobile terminal of claim 11, wherein the type field includes an indication of at least one of the following types of feedback matrices: channel estimate matrices and beamforming matrices.

13. The mobile terminal of claim 11, wherein the feedback information includes one or more channel estimate matrices and the type field includes an indication of channel estimate matrices.

14. The mobile terminal of claim 11, wherein the feedback information includes one or more beamforming feedback matrices V and the type field includes an indication of beamforming feedback matrices V.

15. The mobile terminal of claim 11, wherein the feedback information includes one or more beamforming feedback matrices S and the type field includes an indication of beamforming feedback matrices S.

16. The method of claim 11, wherein the channel response frame further includes a row field to indicate a number of rows of the one or more feedback matrices and a column field to indicate a number of columns of the one or more feedback matrices.

17. A mobile terminal, comprising:
a plurality of antennas; and
at least one processor operable to:
generate a channel sounding packet for transmission to another mobile terminal;
process from the another mobile terminal a channel response packet, wherein the channel response packet includes one or more feedback matrices generated in response to the channel sounding packet and a type field that includes an indication of an indication of one of a plurality of types of feedback matrices.

18. The mobile terminal of claim 17, wherein the type field includes an indication of at least one of the following types of feedback matrices: channel estimate matrices and beamforming matrices.

19. The mobile terminal of claim 18, wherein the feedback information includes one or more channel estimate matrices and the type field includes an indication of channel estimate matrices.

20. The mobile terminal of claim 17, wherein the feedback information includes one or more beamforming feedback matrices and the type field includes an indication of a type of beamforming feedback matrices.

* * * * *